B. FORD.
SECONDARY OR STORAGE BATTERY.
APPLICATION FILED MAR. 2, 1914.

1,185,788.

Patented June 6, 1916.

WITNESSES:
Rob R Kitchel
Frank E French

INVENTOR
Bruce Ford
BY
Augustus B Stoughton
ATTORNEY.

UNITED STATES PATENT OFFICE

BRUCE FORD, OF PHILADELPHIA, PENNSYLVANIA.

SECONDARY OR STORAGE BATTERY.

1,185,788. Specification of Letters Patent. Patented June 6, 1916.

Application filed March 2, 1914. Serial No. 821,888.

*To all whom it may concern:*

Be it known that I, BRUCE FORD, a citizen of the United States, and a resident of Philadelphia, in the county of Philadelphia and State of Pennsylvania, have invented certain new and useful Improvements in Secondary or Storage Batteries, of which the following is a specification.

The principal object of the present invention is to provide a comparatively inexpensive, efficient and reliable connection for a terminal and a cover, which connection though made of lead or lead alloy will remain tight but can be readily screwed and unscrewed.

The invention will be claimed at the end hereof, but will be first described in connection with the embodiment of it chosen for illustration in the accompanying drawings, in which—

Figure 1:
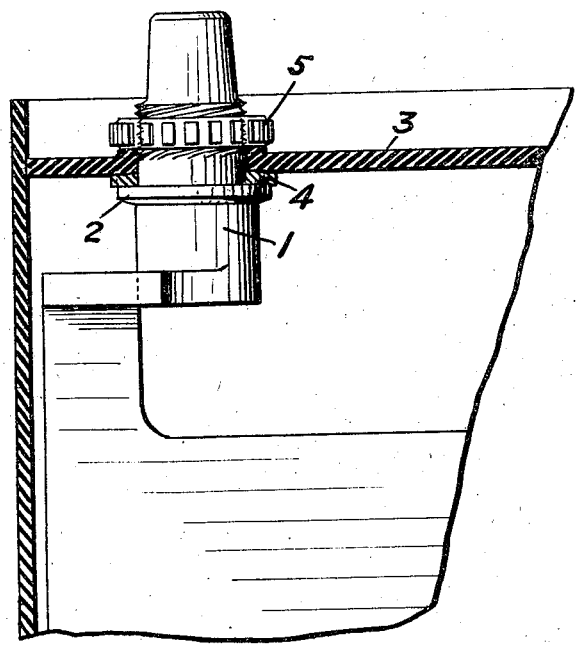
Figure 2:
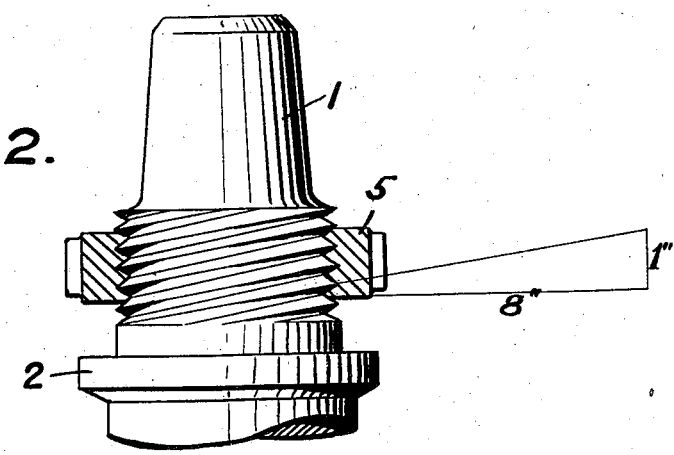

Figure 1, is an elevational view, principally in section, of a connection embodying features of the invention, and Fig. 2, is a similar view drawn to an enlarged scale and illustrating features of the invention.

In the drawings 1 is a leaden terminal or post and it is provided with a flange 2.

3, is a cover having an opening through which the terminal passes.

4 is a gasket between the flange and cover.

5 is a leaden nut on the projecting end of the terminal 1. The thread between the nut and the terminal has a slope of substantially one in eight, as indicated in Fig. 2. In that figure several threads are shown, but the point is that the slope of the thread shall be substantially one in eight. The result of this is that although the parts can be drawn together to hold tight, the nut can be screwed on and off, which is not the case with lead when the angle of the thread is not substantially one in eight. Generally speaking if the nut be screwed onto a leaden member and an attempt is made to remove the nut, it will not unscrew on the thread because the nut and member have, as it is called, frozen together, or become united and when the nut is taken off, the thread is stripped and lost or destroyed. By the combination of the present invention the nut can be readily unscrewed and removed and replaced and screwed on again, which is a matter of obvious advantage.

The term leaden is intended to include materials ordinarily used for the parts of lead storage batteries, as an alloy of lead and antimony.

What I claim is:

1. A detachable connection for a terminal and cover comprising the combination of a leaden terminal having a flange, a cover having an opening through which the terminal passes, a leaden nut on the projecting end of the terminal, and a thread between the nut and terminal of which the slope or angle is substantially one in eight, whereby the nut can be repeatedly unscrewed and screwed on and the parts can be made of the material specified.

2. A detachable connection for a terminal and cover comprising the combination of a leaden terminal having a flange, a cover having an opening through which the terminal passes, a gasket between the flange and cover, a leaden nut on the projecting end of the terminal, and a multiplicity of threads between the nut and terminal of which the slope or angle is substantially one in eight, whereby the nut can be repeatedly unscrewed and screwed on and the parts can be made of the material specified.

3. A connection for storage battery parts or accessories comprising, in combination, two leaden elements to be detachably connected and a thread between them of which the slope or angle is substantially one in eight, whereby the elements can be repeatedly unscrewed and screwed and the parts can withstand corrosive conditions, substantially as described.

BRUCE FORD.

Witnesses:
S. H. FLANDERS,
S. M. NICHOLAS.